A luminaire comprising a lamp comprising an outer structure, a light source configured to emit a source light and carried by the outer structure, a middle structure connected to the outer structure, and a bi-pin base connected to the middle structure. The lamp may further comprise a light guide having an inner surface and an outer surface and a heat dissipating frame having a contact surface in thermal communication with the outer surface of the light guide and comprising a plurality of heat sink rods positioned to abut each other to define the contact surface of the heat dissipating frame. The light source may be configured to emit the source light so as to be incident upon the inner surface of the light guide. The light guide may be configured to change the source light into a shaped light that illuminates a space proximate to the luminaire.

United States Patent
Maxik et al.

(10) Patent No.: US 9,353,916 B2
(45) Date of Patent: *May 31, 2016

(54) ELONGATED LED LUMINAIRE AND ASSOCIATED METHODS

(71) Applicant: LIGHTING SCIENCE GROUP CORPORATION, Melbourne, FL (US)

(72) Inventors: Fredric S. Maxik, Cocoa Beach, FL (US); David E. Bartine, Cocoa, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,353

(22) Filed: Sep. 3, 2015

(65) Prior Publication Data

US 2015/0377424 A1 Dec. 31, 2015

Related U.S. Application Data (63) Continuation of application No. 14/044,939, filed on Oct. 3, 2013, now Pat. No. 9,127,818.

(60) Provisional application No. 61/709,325, filed on Oct. 3, 2012.

(51) Int. Cl.
*F21K 99/00* (2010.01)
*F21V 29/70* (2015.01)
(Continued)

(52) U.S. Cl.
CPC . *F21K 9/175* (2013.01); *F21K 9/50* (2013.01); *F21K 9/52* (2013.01); *F21V 17/06* (2013.01);
(Continued)

(58) Field of Classification Search
CPC .................................. F21K 9/90; F21K 9/175
USPC ............... 362/558, 249.02, 244–247, 218, 362/217.02–217.07
See application file for complete search history.

(56) References Cited

U.S. PATENT DOCUMENTS 4,800,473 A 1/1989 Tremblay
4,924,357 A 5/1990 Yamashita et al.
(Continued)

FOREIGN PATENT DOCUMENTS

EP 0851260 7/1998
EP 1950491 7/2008
(Continued)

OTHER PUBLICATIONS

EP International Written Opinion for Application No. 10174449.8; (Dec. 14, 2010).
(Continued)

*Primary Examiner* — Anabel Ton
(74) *Attorney, Agent, or Firm* — Mark Malek; Stephen Bullock; Widerman Malek, PL (57) ABSTRACT

20 Claims, 6 Drawing Sheets (51) Int. Cl.
*F21V 17/06* (2006.01)
*F21Y 101/02* (2006.01)

(52) U.S. Cl.
CPC . *F21V 29/70* (2015.01); *F21K 9/90* (2013.01); *F21Y 2101/02* (2013.01); *Y02B 20/386* (2013.01); *Y10T 29/49117* (2015.01)

(56) References Cited

U.S. PATENT DOCUMENTS

| | | |
|---|---|---|
| 5,057,908 A | 10/1991 | Weber |
| 5,523,878 A | 6/1996 | Wallace et al. |
| 5,704,701 A | 1/1998 | Kavanagh et al. |
| 5,813,753 A | 9/1998 | Vriens et al. |
| 5,997,150 A | 12/1999 | Anderson |
| 6,140,646 A | 10/2000 | Busta et al. |
| 6,290,382 B1 | 9/2001 | Bourn et al. |
| 6,341,876 B1 | 1/2002 | Moss et al. |
| 6,356,700 B1 | 3/2002 | Strobl |
| 6,370,168 B1 | 4/2002 | Spinelli |
| 6,542,671 B1 | 4/2003 | Ma et al. |
| 6,561,656 B1 | 5/2003 | Kojima et al. |
| 6,594,090 B2 | 7/2003 | Kruschwitz et al. |
| 6,647,199 B1 | 11/2003 | Pelka et al. |
| 6,707,611 B2 | 3/2004 | Gardiner et al. |
| 6,733,135 B2 | 5/2004 | Dho |
| 6,767,111 B1 | 7/2004 | Lai |
| 6,817,735 B2 | 11/2004 | Shimizu et al. |
| 6,870,523 B1 | 3/2005 | Ben-David et al. |
| 6,871,982 B2 | 3/2005 | Holman et al. |
| 6,893,140 B2 | 5/2005 | Storey et al. |
| 6,921,920 B2 | 7/2005 | Kazakevich |
| 6,945,672 B2 | 9/2005 | Du et al. |
| 6,964,501 B2 | 11/2005 | Ryan |
| 6,967,761 B2 | 11/2005 | Starkweather et al. |
| 6,974,713 B2 | 12/2005 | Patel et al. |
| 7,042,623 B1 | 5/2006 | Huibers et al. |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads et al. |
| 7,178,941 B2 | 2/2007 | Roberge et al. |
| 7,178,946 B2 | 2/2007 | Saccomanno et al. |
| 7,184,201 B2 | 2/2007 | Duncan |
| 7,187,484 B2 | 3/2007 | Mehrl |
| 7,213,926 B2 | 5/2007 | May et al. |
| 7,246,923 B2 | 7/2007 | Conner |
| 7,247,874 B2 | 7/2007 | Bode et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,306,352 B2 | 12/2007 | Sokolov et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,344,280 B2 | 3/2008 | Panagotacos et al. |
| 7,349,095 B2 | 3/2008 | Kurosaki |
| 7,353,859 B2 | 4/2008 | Stevanovic et al. |
| 7,382,091 B2 | 6/2008 | Chen et al. |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,431,489 B2 | 10/2008 | Yeo et al. |
| 7,434,946 B2 | 10/2008 | Huibers |
| 7,438,443 B2 | 10/2008 | Tatsuno et al. |
| 7,476,016 B2 | 1/2009 | Kurihara |
| 7,520,642 B2 | 4/2009 | Holman et al. |
| 7,530,708 B2 | 5/2009 | Park |
| 7,537,347 B2 | 5/2009 | Dewald |
| 7,540,616 B2 | 6/2009 | Conner |
| 7,545,569 B2 | 6/2009 | Cassarly |
| 7,556,406 B2 | 7/2009 | Petroski et al. |
| 7,591,578 B2 | 9/2009 | Chang |
| 7,598,686 B2 | 10/2009 | Lys et al. |
| 7,605,971 B2 | 10/2009 | Ishii et al. |
| 7,626,755 B2 | 12/2009 | Furuya et al. |
| 7,670,021 B2 | 3/2010 | Chou |
| 7,677,736 B2 | 3/2010 | Kasazumi et al. |
| 7,684,007 B2 | 3/2010 | Hull et al. |
| 7,703,943 B2 | 4/2010 | Li et al. |
| 7,705,810 B2 | 4/2010 | Choi et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,766,490 B2 | 8/2010 | Harbers et al. |
| 7,771,085 B2 | 8/2010 | Kim |
| 7,819,556 B2 | 10/2010 | Heffington et al. |
| 7,824,075 B2 | 11/2010 | Maxik et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Gruber |
| 7,845,823 B2 | 12/2010 | Mueller et al. |
| 7,871,839 B2 | 1/2011 | Lee et al. |
| 7,874,690 B2 | 1/2011 | Weber, III et al. |
| 7,880,400 B2 | 2/2011 | Zhou et al. |
| 7,883,241 B2 | 2/2011 | Ho |
| 7,889,430 B2 | 2/2011 | El-Ghoroury et al. |
| 7,906,722 B2 | 3/2011 | Fork et al. |
| 7,906,789 B2 | 3/2011 | Jung et al. |
| 7,922,356 B2 | 4/2011 | Maxik et al. |
| 7,928,565 B2 | 4/2011 | Brunschwiler et al. |
| 7,972,030 B2 | 7/2011 | Li |
| 7,976,205 B2 | 7/2011 | Grotsch et al. |
| 8,016,443 B2 | 9/2011 | Falicoff et al. |
| 8,038,314 B2 | 10/2011 | Ladewig |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,070,324 B2 | 12/2011 | Kornitz et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,188,687 B2 | 5/2012 | Lee et al. |
| 8,201,968 B2 | 6/2012 | Maxik et al. |
| 8,251,561 B2 | 8/2012 | Montgomery et al. |
| 8,272,763 B1 | 9/2012 | Chinnam et al. |
| 8,274,089 B2 | 9/2012 | Lee et al. |
| 8,297,783 B2 | 10/2012 | Kim |
| 8,297,798 B1 | 10/2012 | Pittman et al. |
| 8,310,171 B2 | 11/2012 | Reisenauer et al. |
| 8,319,445 B2 | 11/2012 | McKinney et al. |
| 8,322,889 B2 | 12/2012 | Petroski |
| 8,324,823 B2 | 12/2012 | Choi et al. |
| 8,324,840 B2 | 12/2012 | Shteynberg et al. |
| 8,328,406 B2 | 12/2012 | Zimmermann |
| 8,331,099 B2 | 12/2012 | Geissler et al. |
| 8,337,029 B2 | 12/2012 | Li |
| 8,337,063 B2 | 12/2012 | Nagasawa et al. |
| 8,384,984 B2 | 2/2013 | Maxik et al. |
| 8,408,725 B1 | 4/2013 | Maxik et al. |
| 8,410,717 B2 | 4/2013 | Shteynberg et al. |
| 8,410,725 B2 | 4/2013 | Jacobs et al. |
| 8,419,249 B2 | 4/2013 | Yatsuda et al. |
| 8,419,254 B2 | 4/2013 | Liao et al. |
| 8,427,590 B2 | 4/2013 | Raring et al. |
| 8,441,210 B2 | 5/2013 | Shteynberg et al. |
| 8,459,856 B2 | 6/2013 | Meir et al. |
| 8,465,167 B2 | 6/2013 | Maxik et al. |
| 8,531,126 B2 | 9/2013 | Kaihotsu et al. |
| 8,545,034 B2 | 10/2013 | Maxik et al. |
| 8,585,242 B2 | 11/2013 | Walczak et al. |
| 8,598,799 B2 | 12/2013 | Tai et al. |
| 8,608,348 B2 | 12/2013 | Maxik et al. |
| 8,613,530 B2 | 12/2013 | Allen et al. |

(56) References Cited

U.S. PATENT DOCUMENTS

| | | |
|---|---|---|
| 8,616,736 B2 | 12/2013 | Pan |
| 8,662,672 B2 | 3/2014 | Hikmet et al. |
| 8,672,518 B2 | 3/2014 | Boomgaarden et al. |
| 8,674,613 B2 | 3/2014 | Gray et al. |
| 8,678,787 B2 | 3/2014 | Hirata et al. |
| 8,730,558 B2 | 5/2014 | Maxik et al. |
| 8,733,949 B2 | 5/2014 | Chong et al. |
| 8,740,410 B2 | 6/2014 | Peifer et al. |
| 8,770,773 B2 | 7/2014 | Yoshida et al. |
| 8,770,821 B2 | 7/2014 | Ijzerman et al. |
| 8,794,811 B2 | 8/2014 | Germain et al. |
| 8,803,166 B2 | 8/2014 | Lin et al. |
| 8,864,340 B2 | 10/2014 | Holland et al. |
| 8,998,448 B2 | 4/2015 | Chang |
| 9,028,091 B2 | 5/2015 | Holland et al. |
| 9,030,110 B2 | 5/2015 | Lee et al. |
| 9,127,818 B2 * | 9/2015 | Maxik ............ F21K 9/175 |
| 2002/0151941 A1 | 10/2002 | Okawa et al. |
| 2004/0052076 A1 | 3/2004 | Mueller et al. |
| 2005/0033119 A1 | 2/2005 | Okawa et al. |
| 2005/0218780 A1 | 10/2005 | Chen |
| 2006/0002108 A1 | 1/2006 | Ouderkirk et al. |
| 2006/0002110 A1 | 1/2006 | Dowling et al. |
| 2006/0103777 A1 | 5/2006 | Ko et al. |
| 2006/0164005 A1 | 7/2006 | Sun |
| 2006/0232992 A1 | 10/2006 | Bertram et al. |
| 2006/0285193 A1 | 12/2006 | Kimura et al. |
| 2007/0013871 A1 | 1/2007 | Marshall et al. |
| 2007/0041167 A1 | 2/2007 | Nachi |
| 2007/0159492 A1 | 7/2007 | Lo et al. |
| 2007/0188847 A1 | 8/2007 | McDonald et al. |
| 2007/0241340 A1 | 10/2007 | Pan |
| 2008/0143973 A1 | 6/2008 | Wu |
| 2008/0198572 A1 | 8/2008 | Medendorp |
| 2008/0232084 A1 | 9/2008 | Kon |
| 2008/0232116 A1 | 9/2008 | Kim |
| 2008/0258643 A1 | 10/2008 | Cheng et al. |
| 2008/0316432 A1 | 12/2008 | Tejada |
| 2009/0009102 A1 | 1/2009 | Kahlman et al. |
| 2009/0059099 A1 | 3/2009 | Linkov et al. |
| 2009/0059585 A1 | 3/2009 | Chen et al. |
| 2009/0128781 A1 | 5/2009 | Li |
| 2009/0141506 A1 | 6/2009 | Lan et al. |
| 2009/0273931 A1 | 11/2009 | Ito et al. |
| 2010/0006762 A1 | 1/2010 | Yoshida et al. |
| 2010/0039704 A1 | 2/2010 | Hayashi et al. |
| 2010/0051976 A1 | 3/2010 | Rooymans |
| 2010/0103389 A1 | 4/2010 | McVea et al. |
| 2010/0202129 A1 | 8/2010 | Abu-Ageel |
| 2010/0270942 A1 | 10/2010 | Hui et al. |
| 2010/0321641 A1 | 12/2010 | Van Der Lubbe |
| 2011/0080635 A1 | 4/2011 | Takeuchi |
| 2012/0002411 A1 | 1/2012 | Ladewig |
| 2012/0051041 A1 | 3/2012 | Edmond et al. |
| 2012/0201034 A1 | 8/2012 | Li |
| 2012/0218774 A1 | 8/2012 | Livingston |
| 2012/0262902 A1 | 10/2012 | Pickard et al. |
| 2012/0327650 A1 | 12/2012 | Lay et al. |
| 2013/0021792 A1 | 1/2013 | Snell et al. |
| 2013/0294071 A1 | 11/2013 | Boomgaarden et al. |
| 2013/0294087 A1 | 11/2013 | Holland et al. |
| 2013/0296976 A1 | 11/2013 | Maxik et al. |
| 2014/0056026 A1 | 2/2014 | Boomgaarden et al. |
| 2014/0268870 A1 | 9/2014 | Boomgaarden et al. |

FOREIGN PATENT DOCUMENTS

| | | |
|---|---|---|
| EP | 2410240 | 1/2012 |
| WO | WO 2008137732 | 11/2008 |
| WO | WO 2012135173 | 10/2012 |

OTHER PUBLICATIONS

EP International Search Report for Application No. 10174449.8; (Dec. 14, 2010).

Arthur P. Fraas, Heat Exchanger Design, 1989, p. 60, John Wiley & Sons, Inc., Canada.

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

J. Y. San, C. H. Huang, M. H, Shu, "Impingement cooling of a confined circular air jet", In t. J. Heat Mass Transf., 1997. pp. 1355-1364, vol. 40.

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

S. A Solovitz, L. D. Stevanovic, R. A Beaupre, "Microchannels Take Heatsinks to the Next Level", Power Electronics Technology, Nov. 2006.

Tannith Cattermole, "Smart Energy Class controls light on demand", Gizmag.com, Apr. 18, 2010 accessed Nov. 1, 2011.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

U.S. Patent and Trademark Office's Non-Final Office Action dated Jan. 22, 2015 cited in related U.S. Appl. No. 14/044,939 (5 pages).

Response to Non-Final Office Action dated Apr. 22, 2015 filed in related U.S. Appl. No. 14/044,939 (8 pages).

\* cited by examiner

ELONGATED LED LUMINAIRE AND ASSOCIATED METHODS

RELATED APPLICATIONS

This application is a continuation of and claims the benefit under 35 U.S.C. §120 of U.S. patent application Ser. No. 14/044,939 filed on Oct. 3, 2013 and titled Elongated LED Luminaire and Associated Methods, which in turn claims the benefit under 119(e) of U.S. Provisional Patent Application Ser. No. 61/709,325 filed on Oct. 3, 2012 and titled Elongated LED Lighting System and Associated Methods, the entire contents of each of which are incorporated herein by reference, except to the extent disclosures therein are inconsistent with disclosure herein.

FIELD OF THE INVENTION

The present invention relates generally to the field of lighting and, in particular, to luminaires used to replace fluorescent lamps, and associated methods.

BACKGROUND OF THE INVENTION

A fluorescent lamp (also called a fluorescent tube) uses electrical current to excite a vapor within a glass tube resulting in the discharge of electrons. Visible light is produced when the electrons cause a material coating the inner wall of the glass tube to fluoresce. Linear fluorescent lamps are routinely used in commercial or institutional buildings, and are commonly installed in troffer light fixtures (recessed troughs installed in a ceiling) and pendant light fixtures (housings suspended from a ceiling by a chain or pipe).

Fluorescent lamps have been steadily replacing incandescent lamps in many lighting applications. Compared to an incandescent lamp, a fluorescent lamp converts electrical power into useful light more efficiently, delivers a significantly longer useful life, and presents a more diffuse and physically larger light source. However, fluorescent lamp technology has disadvantages. A fluorescent lamp is typically more expensive to install and operate than an incandescent lamp because the fluorescent lamp requires a ballast to regulate the electrical current. Fluorescent light fixtures cannot be connected directly to dimmer switches intended for incandescent lamps, but instead require a compatible dimming ballast. The performance of fluorescent lamps may be negatively impacted by environmental conditions such as frequent switching and operating temperatures. Many fluorescent lamps have poor color temperature, resulting in a less aesthetically pleasing light. Some fluorescent lamps are characterized by prolonged warm-up times, requiring up to three minutes before maximum light output is achieved. Also, if a fluorescent lamp that uses mercury vapor is broken, a small amount of mercury (classified as hazardous waste) can contaminate the surrounding environment.

Digital lighting technologies such as light-emitting diodes (LEDs) offer significant advantages over traditional linear fluorescent lamps. These include, but are not limited to, better lighting quality, longer operating life, and lower energy consumption. Increasingly, LEDs are being designed to have desirable color temperatures. Moreover, LEDs do not contain mercury. Consequently, a market exists for LED-based retrofit alternatives to legacy lighting fixtures that use fluorescent lamps. However, a number of installation challenges and costs are associated with replacing linear fluorescent lamps with LED illumination devices. The challenges, which are understood by those skilled in the art, include light production, thermal management, and installation ease. The costs, which are similarly understood by those skilled in the art, typically stem from a need to replace or reconfigure a troffer or pendant fixture that is configured to support fluorescent lamps to instead support LEDs.

By the very nature of their design and operation, LEDs have a directional light output. Consequently, employing LEDs to produce light distribution properties approximating or equaling the light dispersion properties of traditional lamps may require the costly and labor-intensive replacement or reconfiguration of the host light fixture, and/or the expensive and complexity-introducing design of LED-based solutions that minimize the installation impact to the host light fixture. Often material and manufacturing costs are lost in this trade off.

Another challenge inherent to operating LEDs is heat. Thermal management describes a system's ability to draw heat away from the LED, either passively or actively. LEDs suffer damage and decreased performance when operating in high-heat environments. Moreover, when operating in a confined environment, the heat generated by an LED and its attending circuitry itself can cause damage to the LED. Heat sinks are well known in the art and have been effectively used to provide cooling capacity, thus maintaining an LED-based light bulb within a desirable operating temperature. However, heat sinks can sometimes negatively impact the light distribution properties of the light fixture, resulting in non-uniform distribution of light about the fixture. Heat sink designs also may add to the weight and/or profile of an illumination device, thereby complicating installation, and also may limit available space for other components needed for delivering light.

Replacement of legacy lighting solutions may be complicated by the need to adapt LED-based devices to meet legacy form standards. For example, in a commercial lighting system retrofit, disposal of a replaced fluorescent lamp's fixture housing often is impractical. Consequently, retrofit lamps often are designed to adapt to a legacy fluorescent fixture, both functionally and aesthetically. Also, power supply requirements of LED-based lighting systems can complicate installation of LEDs as a retrofit to existing light fixtures. LEDs are low-voltage light sources that require constant DC voltage or current to operate optimally, and therefore must be carefully regulated. Too little current and voltage may result in little or no light. Too much current and voltage can damage the light-emitting junction of the LED. LEDs are commonly supplemented with individual power adapters to convert AC power to the proper DC voltage, and to regulate the current flowing through during operation to protect the LEDs from line-voltage fluctuations. The lighting industry is experiencing advancements in LED applications, some of which may be pertinent to certain aspects of replacing linear fluorescent lamps.

U.S. Pat. No. 6,739,734 to Hulgan discloses a method of retrofitting a fluorescent light fixture (e.g., four foot T12 or T8 lamps) with LED-based luminaires without requiring removal of the fixture housing. However, rather than maintain existing circuitry, the fixture is stripped not only of its fluorescent lamps but also of its wireway cover and ballast(s). U.S. Published Patent Application No. 2010/0033095 by Sadwick discloses an apparatus for replacing a fluorescent lamp that includes an electrical connector adapted to maintain the existing circuitry of the fixture, including the fluorescent ballast. A voltage converter, direct current (DC) rectifier, and LED light source included in the apparatus simulate the behavior of a fluorescent lamp in response to signals from the fixture's existing circuitry. However, the reference defines a lamp housing physically configured as a prosthetic replacement for a fluorescent lamp in the fixture, rather than as a less expensive non-tubular light-directing structure.

U.S. Pat. No. 6,936,968 to Cross et al., U.S. Pat. No. 6,997,576 to Lodhie, and U.S. Published Patent Application No. 2012/0147597 by Farmer and all disclose versions of an LED light tube adapted for use in troffer light fixtures. The Cross reference defines a cylindrical elongated transparent envelope holding at least one serial string of LEDs along its length. Similarly, the Lodhie reference discloses a substantially transparent hollow cylinder containing multiple LEDs arranged to form two LED arrays, and mounted along opposite sides of a substantially planar printed circuit board (PCB). The Farmer reference also defines a tubular structure, but employs one or more side light LEDs combined with gradient optics to achieve a selected emitted light intensity variation across the surface of the tube. Once again, all three references define a lamp housing physically configured as a prosthetic replacement for a fluorescent lamp in the fixture, rather than as a less expensive non-tubular light-directing structure.

Accordingly, and with the above in mind, a need exists for an effective and inexpensive fluorescent lamp replacement. More specifically, a need exists for a fluorescent lamp replacement that may be employed with minimal reconfiguration of the existing troffer or pendant light fixture that supported the replaced lamp. A fluorescent lamp replacement is needed that may be manufactured at less cost than conventional retrofit lamps. Furthermore, a need exists for a fluorescent lamp that meets or exceeds the performance characteristics of fluorescent lamps, but also delivers the advantages of digital lighting technology (e.g., energy efficiency, tailorable color temperatures).

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a luminaire adapted to be carried by a lighting fixture. The luminaire may comprise a lamp, the lamp comprising an outer structure, a light source that may be configured to emit a source light and carried by the outer structure, a middle structure connected to the outer structure, and a bi-pin base connected to the middle structure. The luminaire may comprise a light guide having an inner surface and an outer surface and a heat dissipating frame having a contact surface in thermal communication with the outer surface of the light guide and comprising a plurality of heat sink rods positioned to abut each other to define the contact surface of the heat dissipating frame. The light source may be configured to emit the source light so as to be incident upon the inner surface of the light guide. Furthermore, the light guide may be configured to change the source light into a shaped light that illuminates a space proximate to the luminaire.

In some embodiments, the bi-pin base comprises a pin lock configured to anchor the lamp to a standard fluorescent socket. Additionally, the outer structure of the lamp may further comprise a shelf and an optic. Furthermore, the light source may be disposed on the shelf and oriented such that the source light emitted from the light source passes through the optic.

In some embodiments, the light guide may further be configured to change the source light into the shaped light using at least one of collimation, concentration, refraction, conversion, reflection, and diffusion. Additionally, the inner surface of the light guide may comprise an optically transmissive material and a reflective material that are configured, in combination, to change the source light into the shaped light.

In some embodiments, the light guide may comprise a conversion material configured to convert a wavelength of the source light so that the wavelength of the shaped light is defined as having a converted wavelength range. Additionally, the light guide may comprise a bi-pin connector configured to mechanically attach to a standard fluorescent socket. Furthermore, the light guide may comprise a mounting aperture positioned opposite the bi-pin connector. The mounting aperture may be sized to fittedly receive at least one of the bi-pin base and the middle structure of the lamp such that a portion of the outer structure of the lamp is positioned adjacent to the light guide. Furthermore, the light guide comprises a substantially elongated-basket shape between the bi-pin connector and the mounting aperture.

In some embodiments, the heat dissipating frame comprises a through-hole positioned on a substantially frusto-conical attaching end of the heat dissipating frame.

Additionally, embodiments of the present invention are related to a luminaire comprising a lamp comprising an outer structure, a light source configured to emit a source light and carried by the outer structure, a middle structure connected to the outer structure, and a bi-pin base connected to the middle structure. The luminaire may further comprise a light guide having an inner surface and an outer surface and comprising a bi-pin connector configured to mechanically attach to a standard fluorescent socket, and a mounting aperture positioned opposite the bi-pin connector. The mounting aperture may be sized to fittedly receive at least one of the bi-pin base and the middle structure of the lamp such that a portion of the outer structure of the lamp is positioned adjacent to the light guide. Furthermore, the luminaire may comprise a heat dissipating frame having a contact surface in thermal communication with the outer surface of the light guide. The light source may be configured to emit the source light so as to be incident upon the inner surface of the light guide. Additionally, the light guide may be configured to change the source light into a shaped light that illuminates a space proximate to the luminaire.

In some embodiments, the bi-pin base may comprise a pin lock configured to anchor the lamp to a standard fluorescent socket. Furthermore, the outer structure of the lamp further may comprise a shelf and an optic, and the light source may be disposed on the shelf and oriented such that the source light emitted from the light source passes through the optic. Additionally, the light guide may be further configured to change the source light into the shaped light using at least one of collimation, concentration, refraction, conversion, reflection, and diffusion.

In some embodiments, the inner surface of the light guide may comprise an optically transmissive material and a reflective material that are configured, in combination, to change the source light into the shaped light. Furthermore, the light guide may comprise a conversion material configured to convert a wavelength of the source light so that the wavelength of the shaped light is defined as having a converted wavelength range. Additionally, the light guide may comprise a bi-pin connector configured to mechanically attach to a standard fluorescent socket.

In some embodiments, the heat dissipating frame may comprise a through-hole positioned on a substantially frustoconical attaching end of the heat dissipating frame. Furthermore, the light guide may comprise a substantially elongated-basket shape between the bi-pin connector and the mounting aperture. Additionally, the middle structure may comprise a heat sink section in thermal communication with the light source. The heat dissipating frame may comprise a through-hole disposed on an attaching end of the heat dissipating frame and positioned such that a rim of the through-hole is in thermal communication with the heat sink section of the middle structure of the luminaire.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention. Like numbers refer to like elements throughout.

The terms "generally" and "substantially" may be used throughout the application. "Generally" may be understood to mean approximately, about, or otherwise similar in content or value. "Substantially" may be understood to mean mostly, more than not, or approximately greater than half. The meanings of these terms must be interpreted in light of the context in which they are used, with additional meanings being potentially discernible therefrom.

Referring now to FIGS. 1A-5, a luminaire 100 according to an embodiment of the present invention is now described in detail. Throughout this disclosure, the present invention may be referred to as the luminaire 100, a lighting system, a digital light, an LED lighting system, a device, a system, a product, and a method. Furthermore, in the following disclosure, the present invention may be referred to as relating to replacement of linear fluorescent lamps, fluorescent tube lamps, tube lights, troffer tubes, and fluorescent light bulbs. Those skilled in the art will appreciate that this terminology is only illustrative and does not affect the scope of the invention. For instance, the present invention may just as easily relate to lasers or other digital lighting technologies, and may operate as a retrofit for non-linear troffer tubes or to other fluorescent light configurations.

Example devices, systems, and methods for an elongate LED luminaire are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Figure 1A:
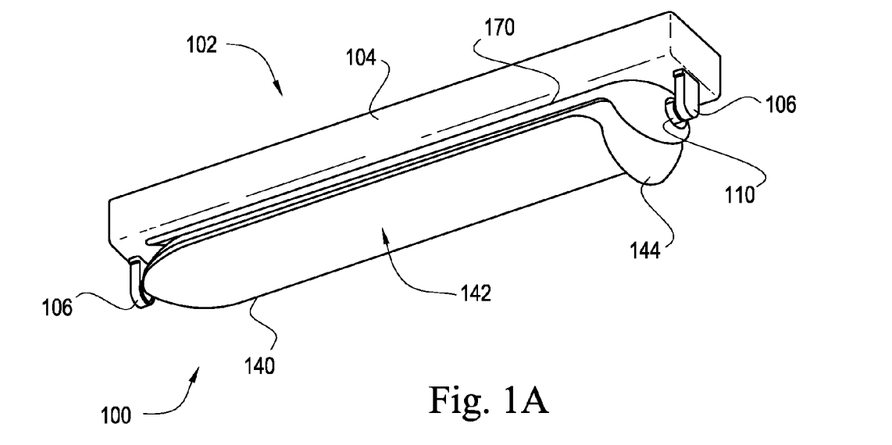
FIG. 1A is an assembled, perspective bottom view of an elongate LED luminaire used in connection with a troffer fixture according to an embodiment of the present invention.
Figure 1B:
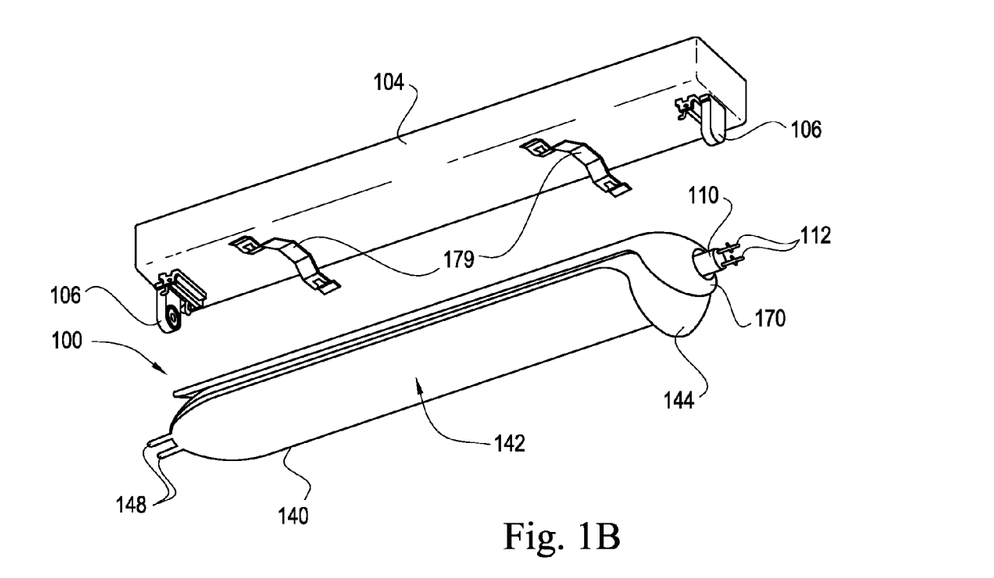
FIG. 1B is a first exploded perspective view of the elongate LED luminaire illustrated in FIG. 1A.
Figure 1C:
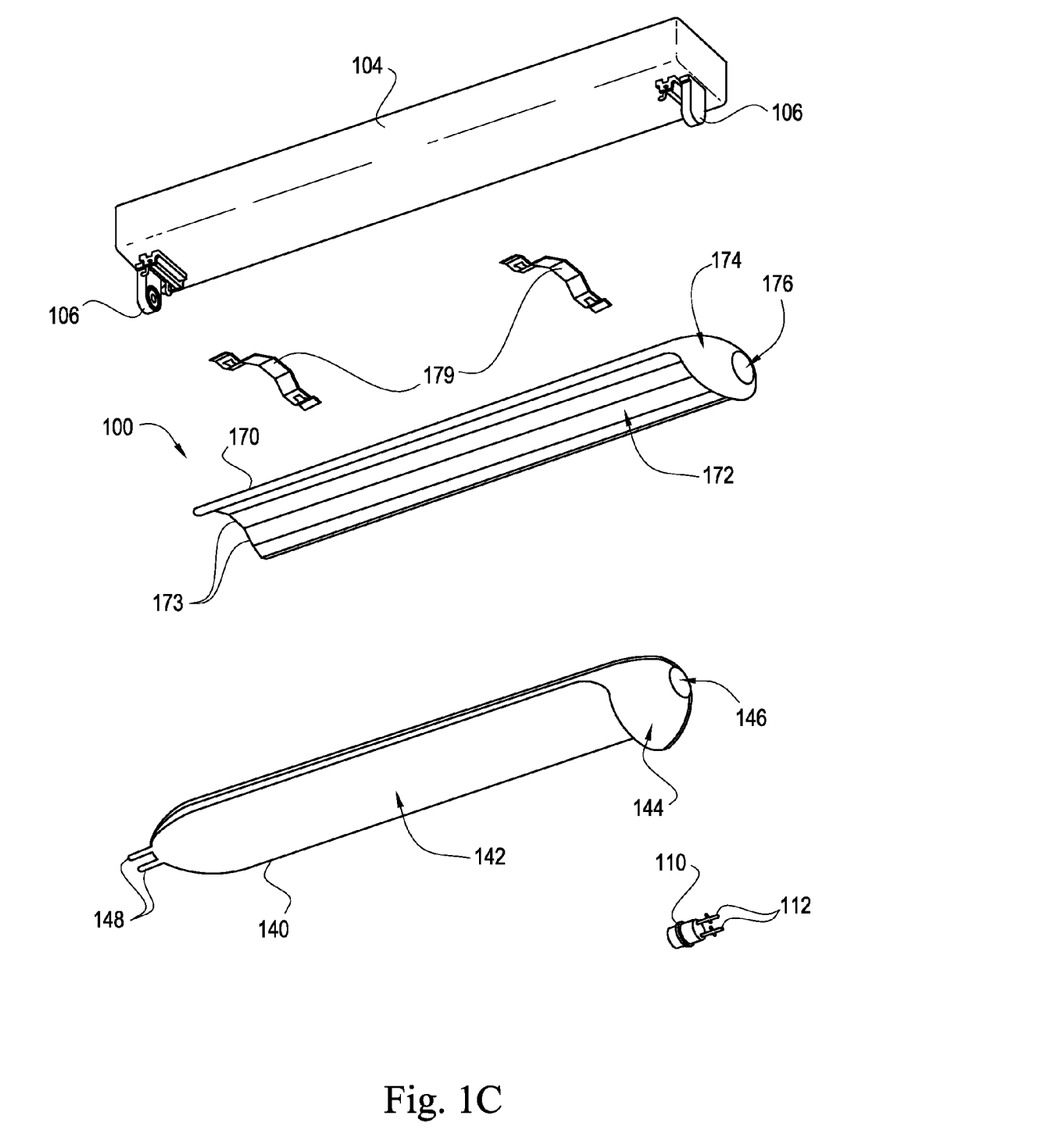
FIG. 1C is a second exploded perspective view of the elongate LED luminaire illustrated in FIG. 1A.

Referring now to FIGS. 1A, 1B, and 1C, an elongate LED luminaire 100 configured to be carried by a light fixture will now be discussed. In various implementations, the luminaire 100 shown as part of a lighting assembly 102 in FIG. 1A and also shown separately as a luminaire 100 in FIGS. 1B and 1C may be used alone or together with other similar lighting assemblies in a system of lighting assemblies. For example, and without limitation, the luminaire 100 may be configured as a retrofit to engage mechanically and operationally with a conventional fluorescent light fixture such as the light fixture 104 illustrated in FIGS. 1A-1C. Used alone or in combination with other lighting assemblies, the luminaire 100 may be advantageously employed as a fluorescent tube replacement in a variety of applications including, but not limited to, direct-view or indirect-view interior or exterior space (e.g., architectural) lighting and illumination in general. The luminaire 100 may also be advantageously used in connection with direct or indirect illumination of objects or spaces, theatrical or other entertainment-based/special effects lighting, decorative lighting, safety-oriented lighting, lighting associated with, or illumination of, displays and/or merchandise (e.g. for advertising and/or in retail/consumer environments), combined lighting or illumination and communication systems, as well as for various indication, display and information purposes.

More specifically, the luminaire 100, according to an embodiment of the present invention, may include a lamp 110, a light guide 140 positioned in optical communication with the lamp 110, and a heat dissipating frame 170 positioned in thermal communication with at least one of the lamp 110 and the light guide 140. Additionally, the luminaire 100 may further include one or more mounting brackets 179 adapted to mechanically attach the luminaire 100 to a light fixture 104. Although luminaire 100 is depicted as having an elongated basket shape in FIGS. 1A-1C, luminaire 100 and its constituent components may have any of a variety of other shapes, including planar and cylindrical.

Figure 2A:
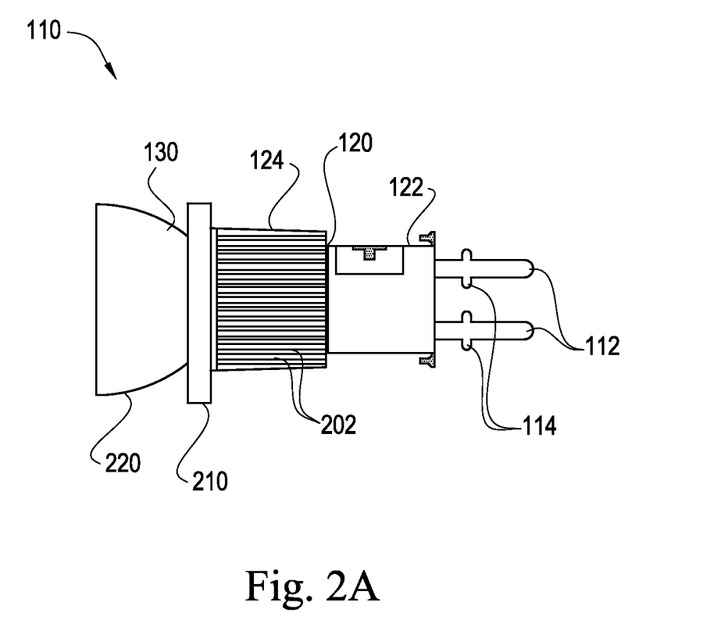
FIG. 2A is a side elevation view of a lamp of the elongate LED luminaire illustrated in FIG. 1A.
Figure 2B:
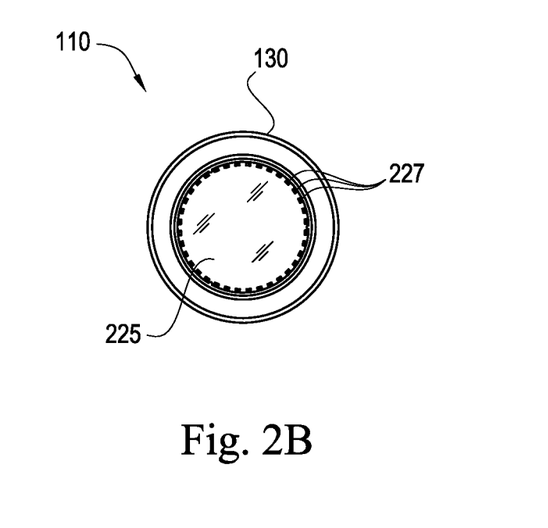
FIG. 2B is a front elevation view of the lamp illustrated in FIG. 2A.

Referring additionally to FIGS. 2A and 2B, the lamp 110, according to an embodiment of the present invention, may include a bi-pin base 112, a middle structure 120 connected to the bi-pin base 112, and an outer structure 130 connected to the middle structure 120. The outer structure 130 may be attached to the middle structure 120 which, in turn, may be similarly connected to the bi-pin base 112 by any means known in the art, including, not by limitation, use of one or more of adhesives or glues, welding, and fasteners. In defining the middle structure 120 and outer structure 130, reference is made herein specifically to FIGS. 2, 8, 9A, 9B, and 11, and the written description thereof, of U.S. patent application Ser. No. 12/698,829 titled Luminaire With Prismatic Optic filed on May 3, 2012, the entire content of which is incorporated herein by reference.

Continuing to refer to FIGS. 1A, 1B, 1C, and 2A, the bi-pin base 112 may be configured to anchor to a fluorescent socket 106. More specifically, the bi-pin base 112 may be configured to mechanically and electrically couple the lamp 110 to any standard fluorescent socket of a type that is well known in the art, including, but not limited to, medium bi-pin sockets (T8/T12), mini bi-pin sockets (T5/T5HO), single pin sockets (T12/T8), and U-bend medium bi-pin sockets. Additionally, the lamp 110 may be configured to conform to various sizes and configurations of the aforementioned sockets, including, but not limited to, turn-type sockets, pedestal sockets, and fixed-end sockets. For example, and without limitation, the bi-pin base 112 may include pin locks 114 designed to engage the fluorescent socket 106 from within the fluorescent socket pin contacts, rather than relying on pressure applied from outside the socket pin contacts to keep the lamp 110 from disengaging from the socket pin contacts due to minimal forces, such as gravity. Also for example, and without limitation, the bi-pin base 112 may be formed of an electrically conductive material, such as copper and/or aluminum.

Referring again to FIGS. 2A and 2B, the middle structure 120 of the lamp 110 may be configured to include a housing section 122 and a heat sink section 124. In the present embodiment, the heat sink section 124 may be formed of thermally conductive material and may be positioned in thermal communication with a light source 255. Materials of the heat sink section 124 may include, without limitation, thermoplastic, ceramics, porcelain, aluminum, aluminum alloys, metals, metal alloys, carbon allotropes, and composite materials. A portion of the heat sink section 124 may include a plurality of fins 202. For example, and without limitation, the fins 202 may be configured to run the length of the heat sink section 124 and may extend radially outward therefrom such that at least a distal edge of the fins 202 are substantially exposed to an environment external to the luminaire. The fins 202 may increase the surface area of the heat sink section 124 and may permit fluid flow between adjacent pairs of fins 202, thereby enhancing the cooling capability of the heat sink section 124. Additional information directed to the use of heat sinks for dissipating heat in an illumination apparatus is found in U.S. Pat. No. 7,922,356 titled Illumination Apparatus for Conducting and Dissipating Heat from a Light Source, and in U.S. Pat. No. 7,824,075 titled Method and Apparatus for Cooling a Light Bulb, the entire contents of each of which are incorporated herein by reference.

Continuing to refer to FIG. 2A, a proximal side of the substantially-cylindrical heat sink section 124 may be positioned adjacent to a distal side of the substantially-cylindrical housing section 122 of the middle structure 120. For example, and without limitation, each of the heat sink section 124 and the housing section 122 of the middle structure 120 shown in FIG. 2A may include a void such that the two voids cooperate with each other to define a longitudinal cavity (see also 208 in FIG. 2 of U.S. patent application Ser. No. 12/698,829 which is incorporated herein by reference). Electrical circuitry may be configured to be substantially enclosed within the middle structure 120 according to an embodiment of the invention. For example, and without limitation, a power source (not shown) may be configured to have a shape and sufficient dimensions to be disposed within the longitudinal cavity 208 of the middle structure 120.

The power supply may be configured to convert and condition AC power to DC power for delivery to the light source 225. In one embodiment, the bi-pin base 112 may conduct power from a light fixture that may provide 120-volt alternating current (AC) power. Furthermore, in the embodiment, the light source 225 may comprise LEDs 227 requiring direct current (DC) power at, for instance, five (5) volts. Accordingly, the power supply may comprise circuitry for conditioning the 120-volt AC power to 5-volt DC power. The characteristics of the power being provided to the power supply and be provided by the power supply are exemplary only, and a wide range of characteristics of electricity are contemplated included within the scope of the invention. For example, the bi-pin base 112 may conduct power from a light fixture that may provide power having a voltage within the range of from about 110 votes to about 250 V and a frequency within the range from about 40 Hz to about 70 Hz. Details regarding power supply systems that may be used in connection with the luminaire 100 according to an embodiment of the present invention may be found, for example, in U.S. Provisional Patent Application No. 61/486,322 titled Variable Load Power Supply, the entire content of which is incorporated herein by reference.

Continuing to refer to FIGS. 2A and 2B, according to an embodiment of the present invention, the outer structure 130 may include a shelf 210, an optic 220, and one or more light sources (225). The outer structure 130 may be configured to permit the one or more light sources 225 to be disposed therein and positioned to direct light through the optic 220. In the present embodiment, the shelf 210 may be disposed about a perimeter of the outer structure 130 adjacent the interface between the outer structure 130 and the middle structure 120.

Each light source 225 carried by the outer structure 130 may be provided as one of any number of embodiments. For example, and without limitation, any one of the light sources 225 may include light emitting elements 227. The light emitting elements 227 that may be included in the outer structure 130 may include one or more light-emitting diodes (LEDs) 227. It should be appreciated by the skilled artisan that the lock lamp 110 illustrated in FIG. 2B may include any number of various types of light sources (e.g., all LED-based light sources, LED-based and non-LED-based light sources in combination, etc.) adapted to generate radiation of a variety of different colors, including essentially white light, as will be discussed further below. More specifically, embodiments of the present invention contemplate that any number of light sources may be provided, in addition to any number of different light sources.

Each light source 225 may be configured to emit a source light, which may be defined as a combination of the emissions of each light source 225 present in the lamp 110. Each light source 225 may be configured such that the emitted source light may be incident upon an inner surface 142 of the light guide 140 and subsequently projected generally radially outward from the lamp 110. For example, and without limitation, the light guide 140 may be configured to alter the source light to create a shaped light having a uniform illuminance as projected into the environment exterior to the luminaire 100. One or more of the components comprising the luminaire 100 may be connected by any means or method known in the art, including, not by limitation, use of adhesives or glues, welding, interference fit, and fasteners. Alternatively, one or more components of the luminaire 100 may be molded during manufacturing as an integral part of the luminaire 100.

Continuing to refer to FIGS. 2A and 2B, the outer structure 130 of the lamp 110 also may comprise a shelf 210 and an optic 220. The light source 225 may be disposed on the shelf 210 and oriented such that the source light emitted from the light source 225 passes through the optic 220. The optic 220 may be configured to direct the source light emitted from a light source 225 to be incident upon the light guide 140. The optic 220 may be formed of any transparent, translucent, or substantially translucent material including, but not limited to, glass, fluorite, and polymers, such as polycarbonate. Types of glass include, without limitation, fused quartz, soda-lime glass, lead glass, flint glass, fluoride glass, aluminosilicates, phosphate glass, borate glass, and chalcogenide glass.

Figure 3A:
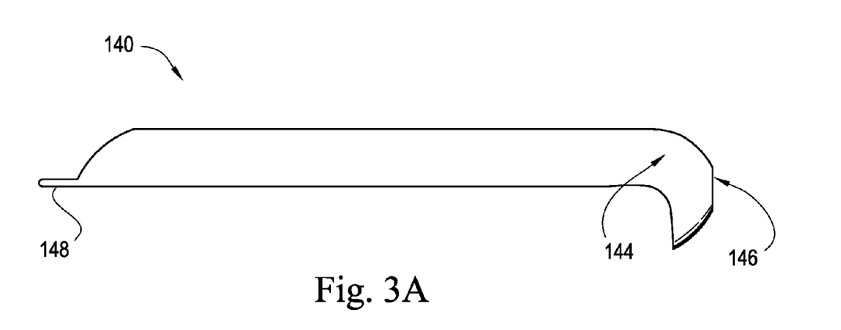
FIG. 3A is a side perspective view of a light guide of the elongate LED luminaire illustrated in FIG. 1A.
Figure 3B:
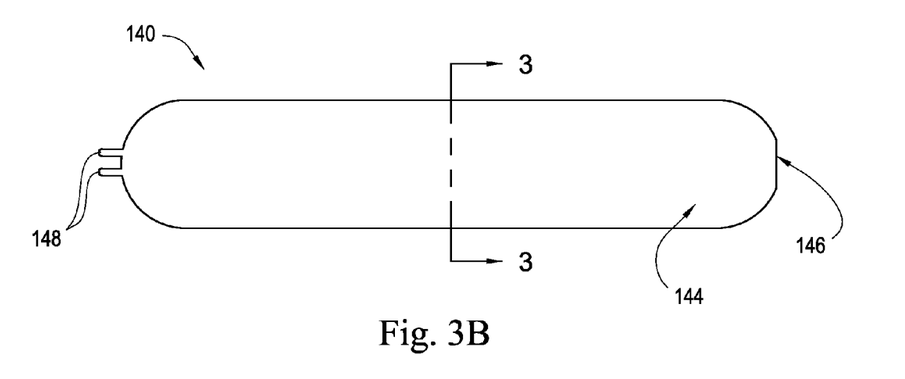
FIG. 3B is a top plan view of the light guide illustrated in FIG. 3A.
Figure 3C:
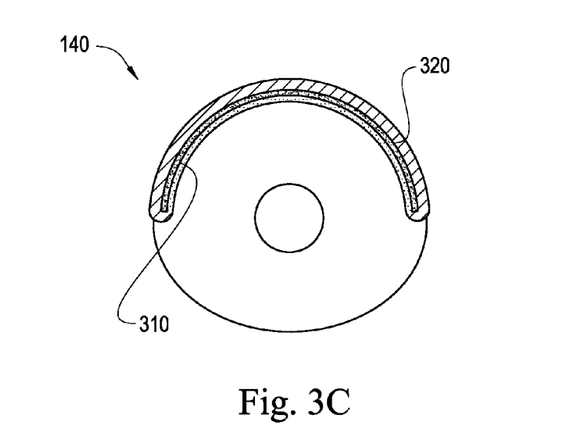
FIG. 3C is a cross-sectional view of the light guide illustrated in FIG. 3A and taken through line 3-3 in FIG. 3B.
Figure 4A:
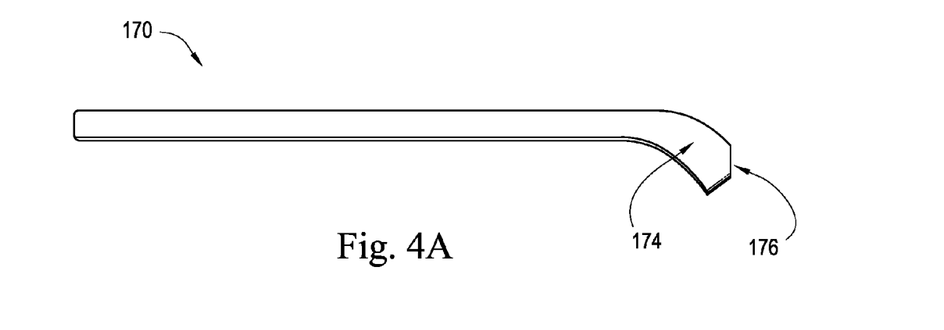
FIG. 4A is a side elevation view of a heat dissipating frame of the elongate LED luminaire illustrated in FIG. 1A.
Figure 4B:
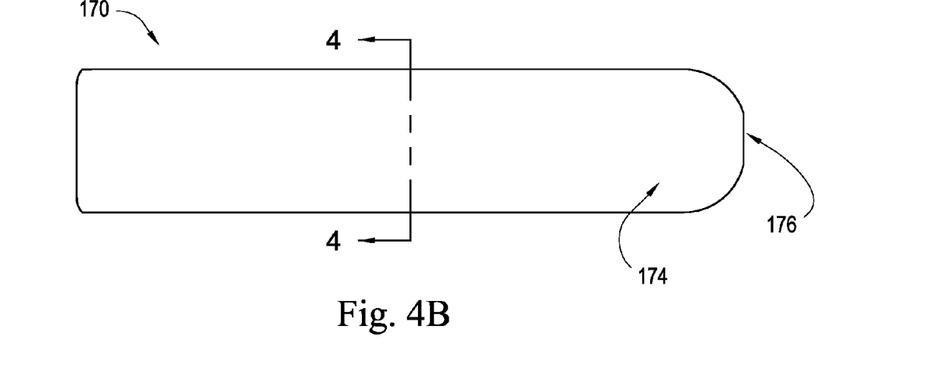
FIG. 4B is a top plan view of the heat dissipating frame illustrated in FIG. 4A.
Figure 4C:
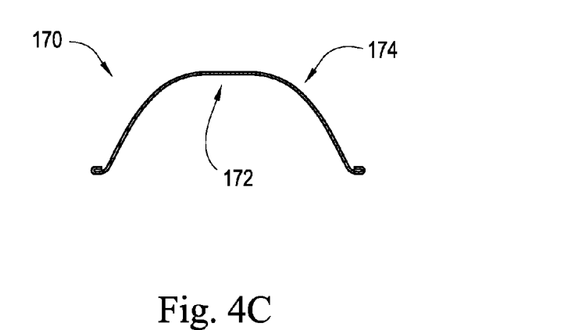
FIG. 4C is a cross-sectional view of the heat dissipating frame illustrated in FIG. 4A and taken through line 4-4 in FIG. 4B.

Referring now to FIGS. 3A, 3B, and 3C, and additionally to FIGS. 1A, 1B, and 1C, the light guide 140 of the present embodiment of the luminaire 100 may include an inner surface 142, an outer surface 144, a mounting aperture 146, and a bi-pin connector 148. The components comprising the light guide 140 may be connected by any means known in the art, including, not by limitation, use of adhesives or glues, welding, and fasteners. Alternatively, one or more components of the light guide 140 may be molded during manufacturing as an integral part of the light guide 140.

As described above, a portion of the outer structure 130 of the lamp 110 may be positioned adjacent to the light guide 140 in the assembled luminaire 100. More specifically, the light source 225 of the lamp 110 may be configured to emit light incident upon the inner surface 142 of the light guide 140. Materials present in the light guide 140 may change the source light into a shaped light using at least one of collimation, concentration, refraction, conversion, reflection, and/or diffusion. For example, and without limitation, the shaped light may illuminate a space proximate to the luminaire in a generally even distribution along the length and/or width of the light guide 140.

As shown in FIGS. 1C, 3A and 3B, the light guide 140 may have a bi-pin connector 148 configured to mechanically attach to a standard fluorescent socket 106. For example, and without limitation, the bi-pin connector 148 may be configured to conform to a standard bi-pin socket 106 for a fluorescent lampholder that is well known in the art. However, the light guide 140 may be configured to mechanically attach via the bi-pin connector 148 to any fluorescent socket 106, including, but not limited to, medium bi-pin sockets (T8/T12), mini bi-pin sockets (T5/T5HO), single pin sockets (T12/T8), and U-bend medium bi-pin sockets. Additionally, the bi-pin connector 148 may be configured to conform to various sizes and configurations of the aforementioned sockets, including, but not limited to, turn-type sockets, pedestal sockets, and fixed-end sockets. The bi-pin connector 148 may be made of a non-conductive material which may support mechanical attachment to the fluorescent socket 106, but which may not allow electrical current to pass through the light guide 140. For example, and without limitation, the length of the bi-pin connector 148 may be long enough to provide mechanical attachment to the fluorescent socket pin contacts, but not long enough to engage the electrical connections within the socket pin contacts.

Continuing to refer to FIGS. 1C, 3A and 3B, the light guide 140 may have a substantially elongated-basket shape that defines an inner surface 142 and an outer surface 144. The outer structure 130 of the lamp 110 may be positioned adjacent to the inner surface 142 of the light guide 140 when the lamp 110 is received by the mounting aperture 146 of the light guide 140. In some embodiments, the one or more light sources 225 in the outer structure 130 of the lamp 110 may be arranged such that each points substantially upwards towards a target reflective area on the inner surface 142 of the light guide 140. This configuration may advantageously enhance light dispersion as light is emitted from the lamp 110, resulting in an inexpensive way to distribute a light pattern that covers the entire target space proximate to the lighting system 100.

For example, and without limitation, as illustrated in FIGS. 1C, 3A and 3B, the mounting aperture 146 may be positioned on a substantially frustoconical single end of the elongate-basket shaped light guide 140 that may be opposite a second end to which the bi-pin connector 148 may be connected. The mounting aperture 146 may be sized to fittedly receive lamp 110 such that the bi-pin connector 112 and the middle structure 120 may pass through the mounting aperture 146, but the shelf 210 of the outer structure 130 of the lamp 110 may be too large to pass through the mounting aperture 146.

The inner surface 142 may include one or more of any type of reflective materials which may be known in the art. For example, and without limitation, the inner surface 142 may be formed of a material that is inherently reflective of light, and therefore a surface upon which emitted light may be incident inherently would be reflective. As another example, the inner surface 142 may be formed of a material that may be polished to become reflective. As yet another example, the inner surface 142 may be formed of a material that is permissive of a material being coated, attached, or otherwise disposed thereupon, the disposed material being reflective. As yet another example, as illustrated in FIG. 3C, the light guide 140 may comprise layers of transmissive 310 and reflective 320 materials. Properties such as, and without limitation, the thickness and the orientation of the transmissive 310 and reflective 320 materials may be manipulated to alter the intensity and direction of the shaped light depending on the distance from a given reflective area on the inner surface 142 of the light guide 140 to the one or more light sources 225 in the outer structure 130 of a lamp 110. As yet another example, it is contemplated that a coating may be placed on the inner surface 142 of the light guide 140 to convert a wavelength of the source light so that the wavelength is defined has having a converted wavelength range. For additional disclosure regarding coatings used to convert a wavelength of a source light, see U.S. patent application Ser. No. 13/234/371 titled Color Conversion Occlusion and Associated Methods, and U.S. patent application Ser. No. 13/357/283 titled Dual Characteristic Color Conversion Enclosure and Associated Methods, the entire contents of each of which are incorporated herein by reference. These methods of forming the light guide 140 are exemplary only and do not serve to limit the scope of the invention. All methods known in the art of forming the reflective inner surface 142 are contemplated and included within the scope of the invention.

Additionally, in some embodiments, the luminaire may be configured to conform to a U-bend florescent bulb configuration, such that the luminaire may be a legacy retrofit for such a troffer fixture. In such embodiments, the light guide may be configured to redirect light such that light is emitted substantially equally throughout the light guide, including those sections of the light guide that are generally distal of the human relative to the light source. Aside from this characteristic, U-bend luminaire embodiments of the invention may be substantially similar or identical to the linear embodiment presented herein, including all necessary and optional features described therewith, with the exception of each feature that must be reconfigured to conform to a U-bend type troffer fixture.

Referring now to FIGS. 1A, 1B, 1C, 4A and 4B, the heat dissipating frame 170 of the present embodiment of the lighting system 100 may include a contact surface 172, a mounting surface 174, and a through-hole 176. For example, and without limitation, the contact surface 172 on the heat dissipating frame 170 may be positioned in thermal communication with the outer surface 144 of the light guide 140. The components comprising the heat dissipating frame 170 may be connected by any means known in the art, including, not by limitation, use of adhesives or glues, welding, and fasteners. Alternatively, one or more components of the heat dissipating frame 170 may be molded during manufacturing as an integral part of the heat dissipating frame 170. A rim of the through-hole 176 may be in thermal communication with the heat sink section 124 of the middle structure 120 of the lamp 110.

Continuing to refer to FIG. 1C, the heat dissipating frame 170 of the luminaire 100 according to an embodiment of the present invention may include one or more heat sink rods 173 that may abut each other to define the contact surface 172 of the heat dissipating frame 170. In various implementations, the heat dissipating frame 170 may be made of aluminum or other heat-conducting material by molding, casting, or stamping. A through-hole 176 may be disposed at a substantially frustoconical attaching end of the heat dissipating frame 170. The through-hole 176 may comprise a rim, defined as a perimeter of the through-hole 176, that may be sized to mechanically and thermally couple the heat dissipating frame 170 to the heat sink section 124 of the middle structure 120 of the luminaire 100 (illustrated in FIG. 2A). For example, and without limitation, in the luminaire 100 presented in an assembled position as illustrated in FIG. 1B, the through-hole 176 of the heat dissipating frame 170 may be aligned with the mounting aperture 146 of the light guide 140 with the contact surface 172 of the heat dissipating frame 170 substantially adjacent to the outer surface 144 of the light guide 140. The lamp 110 may be received simultaneously by both the mounting aperture 146 and the through-hole 176 before mechanically and electrically engaging the fluorescent socket 106 with its bi-pin base 112. In such a configuration, the weight of the heat dissipating frame 170 may be supported by the outer surface 144 of a light guide 140 that is mechanically attached to opposing fluorescent sockets 106 by the bi-pin connector 148 and by the anchored lamp 110, respectively. Additionally, the mounting surface 174 of the heat dissipating frame 170 may be mechanically attached to a lighting assembly 102 using brackets 179 as illustrated in FIGS. 1B and 1C.

In various implementations of the present invention, the luminaire 100 may be configured as a retrofit to engage mechanically and operationally with a conventional fluorescent light fixture. The luminaire 100 shown in FIGS. 1A, 1B, and 1C is an advantageously simple and inexpensive retrofit option in terms of manufacturing, installation and maintenance. For example, the design of the present invention avoids the material waste inherent to prosthetic tube retrofit designs. Furthermore, the on-board power conditioning for LED-based lighting provides for operation of the present invention using existing fluorescent light assembly circuitry and without requiring removal of fluorescent ballasts. The use of LEDs in connection with the lighting system 100 according to an embodiment of the present invention also advantageously provides decreased operating costs with respect to energy consumption. Also, LED-based technology supports tailoring of color temperature in ways not possible with standard fluorescent bulbs (e.g., color temperatures of 3000 Kelvin and below). Additionally, LED-based technology enables the adjustment of color temperature post-installation without requiring replacement of the bulb.

A method aspect of the present invention is directed to assembling a luminaire as a retrofit for a fluorescent tube lamp. The method may comprise the steps of removing the fluorescent tube lamp from a fluorescent light fixture, positioning the heat dissipating frame in thermal contact with the light guide, aligning the through-hole in the heat dissipating frame with a mounting aperture in the light guide, inserting the bi-pin base and the middle structure of the lamp through the mounting aperture in light guide and, in turn, through the through-hole of the heat dissipating frame such that outer structure of the lamp is fixedly attached to the light guide adjacent the mounting aperture. The method also may include attaching the bi-pin connector of the light guide to the first fluorescent socket, and mechanically and electrically attaching the pin lock of the bi-pin base to the second fluorescent socket. The method also may include positioning the light guide in relation to the light source such that the emitted source light is incident upon the light guide, and is changed by the light guide into the shaped light that illuminates the space proximate to the luminaire.

Figure 5:
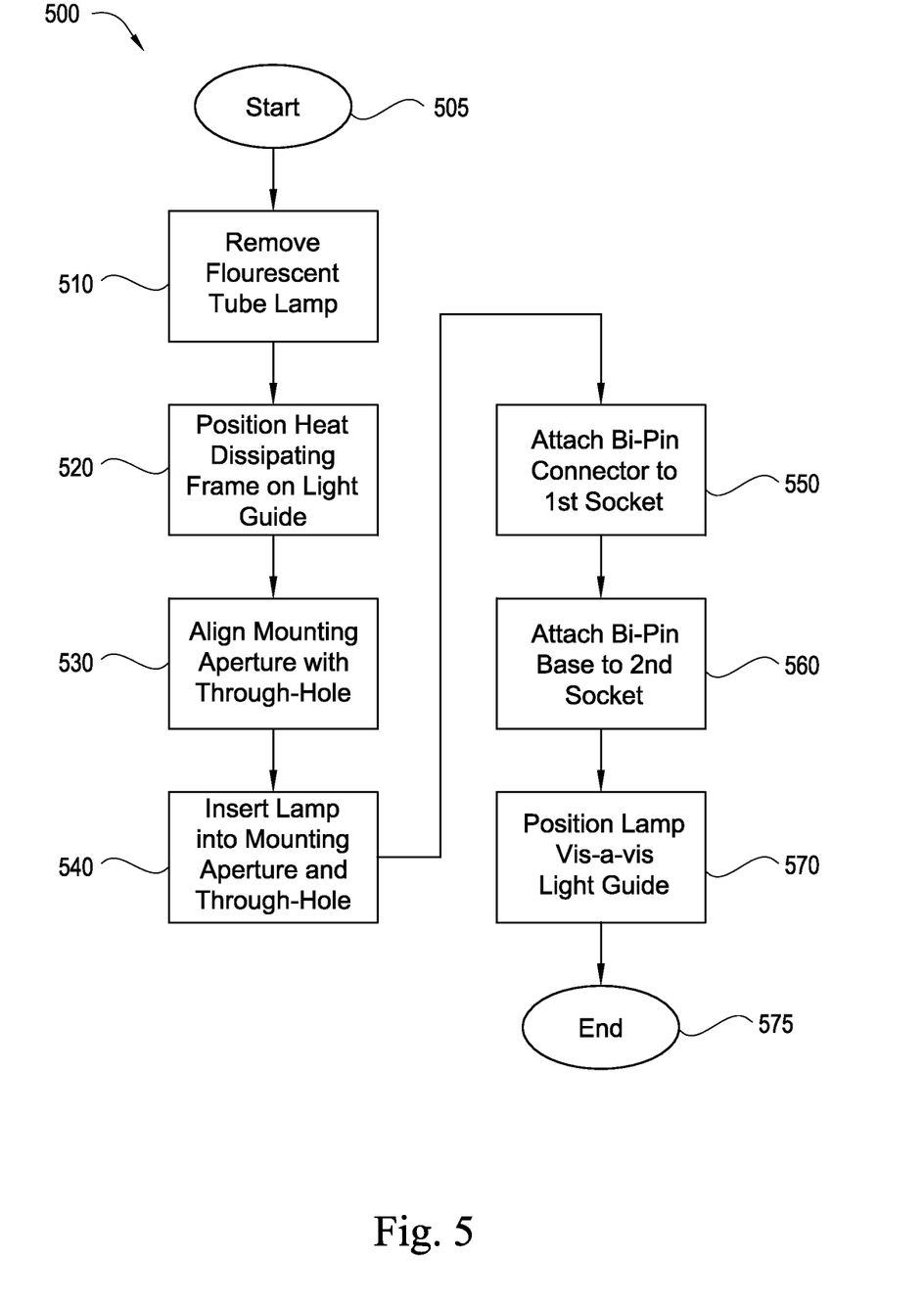
FIG. 5 is a flow chart detailing a method of retrofitting a fluorescent tube lamp with an elongate LED luminaire according to an embodiment of the present invention.

Referring now to FIG. 5, and continuing to refer to FIGS. 1A, 1B, and 1C, a method aspect 500 for retrofitting a fluorescent tube lamp with a luminaire 100 adapted to be carried by a lighting fixture 106 will now be discussed. From the start 505, the retrofit method 500 may include the step of removing a legacy fluorescent lamp from the light fixture 106 (Block 510). At Block 520 the heat dissipating frame 170 may be positioned to be carried by the light guide 140. For example, and without limitation, the contact surface 172 of the heat dissipating frame 170 also may be positioned in thermal communication with the outer surface 144 of the light guide 140. At Block 530, the through-hole 176 of the heat dissipating frame 170 may be aligned with the mounting aperture 146 of the light guide 140 such that the lamp 110 may be received simultaneously by both the mounting aperture 146 and the through-hole 176. At Block 540, the bi-pin base 112 and the middle structure 120 of the lamp 100 may be inserted through the mounting aperture 146 and the through-hole 176 such that the shelf 210 of the outer structure 130 of the lamp 110 abuts the light guide 140. The bi-pin connector 148 of the light guide 140 may be mechanically attached to a first fluorescent socket 106 at Block 550. The bi-pin base 112 of the lamp 110 may be mechanically and electrically attached to a second fluorescent socket 106 at Block 560. In such a configuration, the weight of the heat dissipating frame 170 may be supported by the outer surface 144 of the light guide 140 that is mechanically attached to opposing fluorescent sockets 106 by the bi-pin connector 148 and by the anchored lamp 110, respectively. At Block 570, the light source 225 of the lamp 110 may be configured to emit light incident upon the inner surface 142 of the light guide 140 such that the light guide 140 may change the source light into the shaped light that may illuminate the space proximate to the luminaire in a generally even distribution along the length and/or width of the light guide 140. The process ends at Block 575.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. The scope of the invention should be determined by the appended claims and their legal equivalents, and not by the examples given Therefore, it is understood that the invention is not to be limited to the specific embodiments disclosed.

That which is claimed is:

1. A luminaire comprising:
    a lamp comprising:
        an outer structure,
        a light source configured to emit a source light and carried by the outer structure,
        a middle structure connected to the outer structure, and
        a bi-pin base connected to the middle structure;
    a light guide having an inner surface and an outer surface; and
    a heat dissipating frame having a contact surface in thermal communication with the outer surface of the light guide and comprising a plurality of heat sink rods positioned to abut each other to define the contact surface of the heat dissipating frame;
    wherein the light source is configured to emit the source light so as to be incident upon the inner surface of the light guide; and
    wherein the light guide is configured to change the source light into a shaped light that illuminates a space proximate to the luminaire.

2. The luminaire according to claim 1 wherein the bi-pin base comprises a pin lock configured to anchor the lamp to a standard fluorescent socket.

3. The luminaire according to claim 1 wherein the outer structure of the lamp further comprises a shelf and an optic; and wherein the light source is disposed on the shelf and oriented such that the source light emitted from the light source passes through the optic.

4. The luminaire according to claim 1 wherein the light guide is further configured to change the source light into the shaped light using at least one of collimation, concentration, refraction, conversion, reflection, and diffusion.

5. The luminaire according to claim 1 wherein the inner surface of the light guide comprises an optically transmissive material and a reflective material that are configured, in combination, to change the source light into the shaped light.

6. The luminaire according to claim 1 wherein the light guide comprises a conversion material configured to convert a wavelength of the source light so that the wavelength of the shaped light is defined as having a converted wavelength range.

7. The luminaire according to claim 1 wherein the light guide comprises a bi-pin connector configured to mechanically attach to a standard fluorescent socket.

8. The luminaire according to claim 7 wherein the light guide comprises a mounting aperture positioned opposite the bi-pin connector; and wherein the mounting aperture is sized to fittedly receive at least one of the bi-pin base and the middle structure of the lamp such that a portion of the outer structure of the lamp is positioned adjacent to the light guide.

9. The luminaire according to claim 8 wherein the light guide comprises a substantially elongated-basket shape between the bi-pin connector and the mounting aperture.

10. The luminaire according to claim 1 wherein the heat dissipating frame comprises a through-hole positioned on a substantially frustoconical attaching end of the heat dissipating frame.

11. A luminaire comprising:
    a lamp comprising:
        an outer structure,
        a light source configured to emit a source light and carried by the outer structure,
        a middle structure connected to the outer structure, and
        a bi-pin base connected to the middle structure;
    a light guide having an inner surface and an outer surface and comprising:
        a bi-pin connector configured to mechanically attach to a standard fluorescent socket, and
        a mounting aperture positioned opposite the bi-pin connector,
        wherein the mounting aperture is sized to fittedly receive at least one of the bi-pin base and the middle structure of the lamp such that a portion of the outer structure of the lamp is positioned adjacent to the light guide; and
    a heat dissipating frame having a contact surface in thermal communication with the outer surface of the light guide;
    wherein the light source is configured to emit the source light so as to be incident upon the inner surface of the light guide; and
    wherein the light guide is configured to change the source light into a shaped light that illuminates a space proximate to the luminaire.

12. The luminaire according to claim 11 wherein the bi-pin base comprises a pin lock configured to anchor the lamp to a standard fluorescent socket.

13. The luminaire according to claim 11 wherein the outer structure of the lamp further comprises a shelf and an optic; and wherein the light source is disposed on the shelf and oriented such that the source light emitted from the light source passes through the optic.

14. The luminaire according to claim 11 wherein the light guide is further configured to change the source light into the shaped light using at least one of collimation, concentration, refraction, conversion, reflection, and diffusion.

15. The luminaire according to claim 11 wherein the inner surface of the light guide comprises an optically transmissive material and a reflective material that are configured, in combination, to change the source light into the shaped light.

16. The luminaire according to claim 11 wherein the light guide comprises a conversion material configured to convert a wavelength of the source light so that the wavelength of the shaped light is defined as having a converted wavelength range.

17. The luminaire according to claim 11 wherein the light guide comprises a bi-pin connector configured to mechanically attach to a standard fluorescent socket.

18. The luminaire according to claim 11 wherein the heat dissipating frame comprises a through-hole positioned on a substantially frustoconical attaching end of the heat dissipating frame.

19. The luminaire according to claim 11 wherein the light guide comprises a substantially elongated-basket shape between the bi-pin connector and the mounting aperture.

20. The luminaire according to claim 11 wherein:
the middle structure comprises a heat sink section in thermal communication with the light source; and
the heat dissipating frame comprises a through-hole disposed on an attaching end of the heat dissipating frame and positioned such that a rim of the through-hole is in thermal communication with the heat sink section of the middle structure of the luminaire.

\* \* \* \* \*